United States Patent Office 3,368,867
Patented Feb. 13, 1968

3,368,867
CHROMATOGRAPHIC PURIFICATION OF
INFLUENZA VIRUS WITH BRUSHITE
MODIFIED BY AUTOCLAVING
Milton Lapidus, Rosemont, Pa., assignor to American Home Products Corporation, New York, N.Y., a corporation of New York
No Drawing. Filed Sept. 15, 1964, Ser. No. 396,736
2 Claims. (Cl. 23—103)

ABSTRACT OF THE DISCLOSURE

Influenza viruses, including B strains, are recovered from impure solutions by chromatographic adsorption on brushite which has been modified by autoclaving. After desorption the purified viruses can be killed, then formulated into vaccines useful to prevent influenza.

---

This invention relates to the purification and concentration of virus. More particularly, this invention relates to a new adsorbent useful in the purification of influenza virus, to the method by which this new adsorbent is prepared and to the method by which the same is used in the production of purified and highly concentrated influenza virus.

In recent years increasing attention has been given to methods for the concentration and purification of various types of viruses including in particular the influenza virus.

Earlier methods for such purification included the adsorption on, and elution from chicken red cells as proposed by Hirst, Science, 94, 22 (1941) and McClelland & Hare, Canad. Publ. Hlth. J. 32, 530 (1941). In 1943 Bodily et al. proposed the use of alum while Salk, Science, 101, 122 (1945) and Stanley, J. Exp. Med., 81, 193 (1945) proposed the use of calcium phosphate to precipitate and concentrate influenza virus. A short time later Taylor et al., J. Immunol., 50, 291 (1945) used a centrifuge technique to produce influenza virus on a commercial scale. It is with the latter two methods that the present invention is particularly concerned and directed to improving.

According to the calcium phosphate virus purification method which is more particularly described in the Journal of Gen. Microbiology 19, 451 (1958), Taverne et al., brushite (calcium phosphate ($CaHPO_4 \cdot 2H_2O$)) is described as a suitable adsorbent for the chromatographic purification and concentration of influenza virus. However, the brushite form when prepared according to the method described, is a very time consuming method and the adsorbent once so prepared is very unstable unless stored under very specific conditions. In addition, the brushite form, as described in the Taverne article, while having been found reasonably effective in the purification of the A strain of influenza virus is substantially ineffective in the purification and concentration of the well recognized B strains of such virus.

Consider now for a moment the widely used commercial centrifuge for producing purified influenza vaccine. According to this technique the virus, harvested in the form of infected allantoic fluid, for example, is delivered to a high speed centrifuge such as the Sharples centrifuge. During operation of the centrifuge the virus along with undesirable bacteria impurities, is plated out on the walls of the separator. Thereafter the virus is washed, scraped from the centrifuge walls, buffered and washed again in a blender and once again centrifuged. The recovered virus is inactivated by the addition of formalin and packaged in accordance with established standards utilizing the chick cell agglutination test as a measure of virus titer. The latter is determined in accordance with the National Institutes of Health standards and are a measure of the viruses' ability to agglutinate red blood cells. These test units will be referred to hereinafter for convenience as CCA units.

Though the centrifuge technique is used commercially, it is of very limited capacity in terms of throughput and provides a virus product which while acceptable from a sterility point of view does not in fact have the high degree of purity desired.

It is accordingly an object of the present invention to provide a new and improved form of stable adsorbent which is particularly effective in purifying and concentrating influenza virus.

It is a further object of the present invention to provide an improved form of brushite adsorbent which is effective in purifying all strains of influenza virus including in particular, the B strain which was not previously purifiable by the brushite method.

It is a still further object of the present invention to provide a new and improved method for the preparation of brushite in an effective, stable and highly activated adsorbent form.

It is an additional object of the present invention to provide a new chromatographic process for the concentration and purification of all strains of influenza virus.

It is a still further and additional object of the present invention to provide a process for preparing polyvalent influenza vaccine which includes both A and B strains.

These and other objects and advantages are attainable with the new adsorbent of the present invention, the method of its preparation and the methods in which the new adsorbent is used.

With respect to the composition aspects of the present invention, it has been found, quite unexpectedly, that if during the preparation of brushite, following the formation of the precipitated material, the same is subjected to autoclaving, an improved stable and effective adsorbent is obtained. Such an adsorbent properly activated, while being most effective in the purification of influenza virus generally, such as the A, C and D strains, is quite unexpectedly effective in purifying B strains of influenza virus. The purification of the B strain as will be shown more clearly hereafter in the examples, has not previously been possible by a chromatographic process using the brushite adsorbent.

In addition to being able to purify the "B" strain of influenza virus, the use of autoclaved brushite, properly activated by a selective washing with distilled water to a pH of from about 6.8 to about 7.0, makes possible a very substantial increase in the purity of Sharples concentrated influenza virus. It has been found according to the method of the present invention that if Sharples concentrated influenza virus is adsorbed on autoclaved, activated brushite which has a pH of between 5.5 and 7.5 and preferably at about a pH of about 6.5 to 7.0, followed by a buffer wash and eluting the virus by treating with a buffer of increased molarity, a virus is eluted from the adsorbent which is from 5 to 10 times purer than is obtained by the conventional and standard Sharples centrifuge concentration technique.

It is an additional advantage of the present invention to utilize the new adsorbent thereof in the preparation of a purified and concentrated influenza virus without first concentrating the virus according to the Sharples centrifuge method. That is to say that the new brushite adsorbent of the present invention is so much more effective, for reasons which are not immediately clear, that a concentrated virus of a high degree of purity can be obtained at flow rates which obviate the necessity of first concentrating the virus according to the Sharples methods now used commercially. Under these circumstances it is possible to obtain even the B strain of influenza virus at a purification factor of from 3 to 6 times greater and at a rate of recovery from 2 to 4 times greater than the rate at which the Sharples concentration method can effect separation of the desired influenza virus.

To prepare the new brushite ($CaHPO_4 \cdot 2H_2O$) adsorbent composition of the present invention, substantially equimolar amounts of calcium chloride and sodium phosphate are delivered simultaneously to a common mixing vessel. After mixing has continued for a period of from ½ to 2 hours, preferably about 1 hour, supernatant liquid is removed from the mixing vessel by decantation. The brushite suspension is then washed with distilled water to bring the pH supernatant liquid to about 7.0. The brushite is autoclaved in a suitable apparatus for a period of from about 10 to about 30 minutes at a pressure of from about 10 to 30 p.s.i. which corresponds to a steam temperature of from about 115° C. to about 134° C. and allowed to cool to room temperature. Under these conditions the pH will normally be in the range of from about 5.0 to about 5.4. The modified brushite adsorbent is then washed with distilled water until a pH of about 6.5 is obtained. This activation is preferable though not necessarily carried out just prior to using the autoclaved brushite. The latter step, it has been found, is necessary to provide the adsorbent with the desired degree of activity. Quite unexpectedly at this pH the modified brushite is extremely effective in accomplishing the desired purification and concentration of the influenza virus in all strains, particularly in the B strain in either a concentrated form as by Sharples or in an unconcentrated form, such as for example from an allantoic fluid containing influenza virus.

The modified brushite adsorbent, prepared according to the method described, is more stable than forms previously available and is in addition able to concentrate B strains of influenza virus which previous brushite adsorbents were not able to accomplish.

According to the method aspect of the present invention, the adsorbent in its highly activated form can be used to effect separation of all forms of the influenza virus. To accomplish this, the adsorbent will normally be deaerated and placed in a suitable extraction or chromatographic column to which the virus solution is delivered. The virus solution may take any form, including the concentrated form such as a Sharples concentrated form, as well as unconcentrated forms such as an infected allantoic fluid fresh from harvesting. Following deaeration, the suspension of autoclaved brushite is washed with 0.01 molar phosphate buffer solution to a pH of about 6.8. This will condition the column to the adsorption of the virus. The latter has been similarly worked up to a pH of between 6.8 and 7.2 generally by means of dilute acid. The acid work up is particularly suitable when the virus is in the form of a Sharples concentrated influenza such as the B strain/Great Lakes.

After being placed on the column, the virus adsorbs on the autoclaved brushite and impurities pass through in accordance with conventional chromatographic technique. Thereafter the column is washed with buffer and the virus eluted. The elution is accomplished by increasing the molarity of the buffer wash to about 0.5 molar at a pH preferably of about 6.8. It has been found that a phosphate buffer is generally effective and preferred for elution. Normally, under the conditions described the virus solution will come off at a molarity of about 0.3 or 0.4 molar and is recognized by a turbidity in the take-off vessel. The fraction containing the virus will also be highly opalescent.

The purified virus thus obtained may then be killed such as by treatment with formalin in the buffer solution in which it is contained. The killing is normally the next step in preparing a vaccine of the purified virus. If desired, the virus may be diluted in a buffer so as to be utilized in the preparation of the standard pool vaccine such as a standard 500 CCA/1 ml. vaccine. Such a pool would of course necessarily be required to meet standards established by public health authorities for influenza vaccines. The pool could normally include from 3 to 5 strains of purified killed virus properly balanced with respect to CCA units to provide the total pool with the 500 CCA/1 ml. content required. The latter technique is of course a standard and well known vaccine preparation procedure.

Attention to the examples which follow will provide a better understanding of the new virus purifications adsorbent of the present invention, and the method by which the same is prepared. In addition the examples will describe the method by which improved purification of partial purified or concentrated influenza virus strains is carried out.

*Example I*

Five moles of brushite is prepared from 10 liters of .5 M $CaCl_2 \cdot 2H_2O$ and 10 liters of .5 M $Na_2HPO_4$ by metering both solutions at the rate of 4 liters per hour into a common mixing vessel. After delivery is completed, mixing is continued for one hour. After the brushite settles, the supernatant is removed by decantation. Washing twice with 30 liters of distilled water brings the pH to 7.05. The brushite is then autoclaved for 15 minutes at 20 pounds steam pressure which corresponds to about 125° C. and allowed to cool to room temperature. The pH of the brushite modified by autoclaving is found to be 5.2. The brushite modified by autoclaving is washed with distilled water and with 0.01 molar buffer until pH 6.5 is reached.

The foregoing example sets forth the method by which the new and improved stable autoclaved brushite of the present invention is obtained. In Example II, which follows, there is provided a clear description of the method of using the new adsorbent to effect further purification of Sharples purified Influenza B/GL.

*Example II*

The adsorbent brushite of Example I is deaerated under vacuum and a column 4.4 x 9 cm. is poured and washed with distilled water. Ten ml. of concentrated influenza B/GL, diluted 1:10 (0.01 M phosphate), adjusted to pH 7.0 with dilute HCl is passed into the column of adsorbent. The column is further washed with distilled water and eluted with .5 M, pH 6.8 phosphate buffer. Fraction 3 is highly opalescent and represents purified B/GL. (In the following tables, HA represents Chick Cell Hemagglutination units, also known as CCA units, a standard measure of virus titer.)

COLUMN CHROMATOGRAPHY OF SHARPLES PURIFIED INFLUENZA, B/GL.

| Fraction | Volume, ml. | Total HA | Total Lowry Protein, mg. | HA/mg. Lowry Protein | Purification Factor |
|---|---|---|---|---|---|
| Original | 100 | 819,200 | 25.5 | 32,125 | |
| 1 | 100 | 1,600 | .7 | 2,286 | |
| 2 | 200 | 51,200 | 2.0 | 25,600 | |
| 3 | 50 | 1,638,400 | 5.4 | 303,407 | 9.4 |

In a manner similar to Example II a comparative test was carried out to demonstrate the unexpected effect obtained by the use of the autoclaved brushite of the present invention as compared to the non-autoclaved brushite prepared according to prior technique. The material used in carrying out this comparative test, which was conducted substantially in the manner described in Example II, was infected allantoic fluid B strain/Great Lakes influenza virus.

Example III

| Adsorbent | Brushite | Autoclaved Brushite |
| --- | --- | --- |
| Conditions | .001 M, pH 6.8 phosphate | pH 8.0. |
| Virus | Inf. allantoic—B/GL | Inf. allantoic—B/GL. |
| Put on Column, HA | 512,000 | 256,000. |
| Recovered, HA | 51,200 | 102,400. |
| Percent Recovery | 10 | 40. |
| Purification Factor | 0 | 2. |

It will be noted that the non-autoclaved brushite provided only a 10% recovery and no increase in purity as compared to the autoclaved brushite which gave a yield of 40% and a purification factor of 2. In a similar manner a comparative test was carried out between the autoclaved and non-autoclaved brushite with Sharples concentrated B strain/Great Lakes.

Example IV

| Adsorbent | Brushite | Autoclaved Brushite |
| --- | --- | --- |
| Conditions | .05 M, pH 7 phosphate | pH 6.5. |
| Virus | Sharples B/GL | Sharples B/GL. |
| Put on Column, HA | 262,144,000 | 2,580,480. |
| Recovered, HA | 1,095,000 | 3,276,800. |
| Percent Recovery | .4 | 100. |
| Purification Factor | 0 | 7.4. |

The results above clearly demonstrate the superiority of the new adsorbent of the present invention over the standard form of adsorbent.

As has been previously suggested, the product of the present invention prepared according to the method thereof is ideally suited for use in the preparation of a vaccine which will meet present standards for pooled influenza virus polyvalent, types A and B. Example V which follows demonstrates this important aspect of the present invention.

Example V

The A strains, PR-8, Ann Arbor 1/57 and Jap 305, were purified on 3 molar columns of brushite prepared by the double drop technique. 8.5–11.5 liters of allantoic fluid were adjusted to pH 7.0, and .02 M phosphate. The influenza virus was adsorbed on approximately 9.5 x 30 cm. columns of brushite that were prewashed with .02 M, pH 7.0 phosphate buffer. Following the adsorption, the columns were washed with .02 M, pH 7.0 phosphate buffer and the virus was eluted with .5 M, pH 7.0 phosphate buffer. The concentration of buffer was reduced by dilution of the purified virus fractions and after formaldehyde inactivation and merthiolate addition, a pool of the four times of influenza virus strains was made, containing the following proportion of each strain:

| | CCA units per ml. |
| --- | --- |
| PR-8 | 100 |
| Ann Arbor 1/57 | 100 |
| Jap 305 | 200 |
| Great Lakes 1739/54 | 100 |

This pool met the standards of NIH for influenza virus vaccine, polyvalent, Types A and B.

While the foregoing invention has been described with some degree of particularity, it is to be understood that the specific description is for purposes of illustration and is not intended in any way to act as a limitation on the scope of the invention. The latter is only to be limited by the claims appended hereto.

The invention claimed is:

1. An improved adsorbent for influenza virus purification consisting essentially of brushite modified by autoclaving and activated by washing with distilled water to a pH of about 6.0 to about 7.0, the autoclaving of said brushite being carried out at a pressure of from about 10 p.s.i. to about 30 p.s.i. for a period of from about 10 minutes to about 30 minutes.

2. In a method of preparing an influenza virus purification adsorbent consisting essentially of modified brushite which comprises mixing equimolar amounts of $$CaCl_2 \cdot 2H_2O \text{ and } Na_2HPO_4$$

to form a brushite suspension, settling said suspension allowing a supernatant liquid to separate, removing the supernatant liquid and washing the brushite suspension with distilled water to a pH of about 7, the improvement which comprises subjecting the suspension to an autoclave pressure of from about 10 p.s.i. to about 30 p.s.i. for a period of from about 10 minutes to about 30 minutes and washing the autoclaved suspension with sufficient distilled water so that the suspension has a pH in the range of from about 6.0 to about 7.0.

References Cited

UNITED STATES PATENTS

| | | | |
| --- | --- | --- | --- |
| 1,837,332 | 12/1931 | Ober et al. | 23—109 X |
| 1,907,438 | 5/1933 | Ober et al. | 23—109 X |
| 2,889,217 | 6/1959 | Le Baron | 23—109 X |
| 2,899,271 | 8/1959 | Miche | 23—109 |
| 3,151,936 | 10/1964 | Hollingsworth et al. | 23—109 |
| 3,227,519 | 1/1966 | Turner et al. | 23—105 |

OTHER REFERENCES

Taverne et al.: "Purification and Conc. of Viruses," J. Gen. Microbiol., 19(3), page 454, (1958).

Tiselius et al.: "Protein Chromatography," Arch. Biochem, Biophysics 65(1), pages 132–135 (1956).

OSCAR R. VERTIZ, *Primary Examiner.*

L. A. MARSH, O. F. CRUTCHFIELD,

*Assistant Examiners.*